(12) United States Patent
Okuhara et al.

(10) Patent No.: US 7,533,984 B2
(45) Date of Patent: May 19, 2009

(54) POWER CONNECTION/DISCONNECTION MECHANISM AND MEDIUM FEEDING APPARATUS, RECORDING APPARATUS AND LIQUID EJECTING APPARATUS

(75) Inventors: Katsumi Okuhara, Nagano (JP); Naoki Horie, Nagano (JP)

(73) Assignee: Seiko Epson Corporation (JP)

( * ) Notice: Subject to any disclaimer, the term of this patent is extended or adjusted under 35 U.S.C. 154(b) by 553 days.

(21) Appl. No.: 11/254,772

(22) Filed: Oct. 21, 2005

(65) Prior Publication Data

US 2006/0086203 A1 Apr. 27, 2006

(30) Foreign Application Priority Data

Oct. 21, 2004 (JP) .......................... P2004-307493
Oct. 19, 2005 (JP) .......................... P2005-303959

(51) Int. Cl.
*B41J 2/01* (2006.01)
(52) U.S. Cl. ........................ 347/104; 347/101
(58) Field of Classification Search ................ 347/104, 347/101; 310/92, 94, 76, 78
See application file for complete search history.

(56) References Cited

U.S. PATENT DOCUMENTS

| 942,244 A | 12/1909 | Boda |
| 2,090,614 A * | 8/1937 | Clark ........................ 74/336 R |
| 2,123,030 A | 7/1938 | Von Hofe |
| 3,463,280 A | 8/1969 | Hoffman et al. |
| 3,712,433 A | 1/1973 | Thut |
| 4,119,186 A * | 10/1978 | Choudhury et al. .......... 477/113 |
| 5,838,338 A * | 11/1998 | Olson ............................ 347/8 |
| 5,967,677 A * | 10/1999 | McCue et al. ................ 400/582 |
| 5,982,400 A * | 11/1999 | Yokoi et al. .................. 346/134 |
| 5,984,469 A * | 11/1999 | Koike et al. .................. 347/104 |
| 2003/0173182 A1* | 9/2003 | Kim ........................ 192/223.2 |
| 2004/0124575 A1* | 7/2004 | Lee et al. .................. 271/10.01 |

FOREIGN PATENT DOCUMENTS

| DE | 685818 | 12/1939 |
| JP | 2000-203738 A | 7/2000 |
| JP | 2001-063865 A | 3/2001 |
| JP | 2003-34446 A | 2/2003 |
| JP | 2004-002014 A | 1/2004 |

OTHER PUBLICATIONS

Extended European Search Report dated Oct. 30, 2008.

* cited by examiner

*Primary Examiner*—Stephen D Meier
*Assistant Examiner*—Leonard S Liang
(74) *Attorney, Agent, or Firm*—Sughrue Mion, PLLC

(57) ABSTRACT

A power connection/disconnection mechanism which connects and disconnects power, including: a crutch cover having a claw portion, and a projection which a contact portion of a lever is brought into abutment with; a gear having a toothed portion which the claw portion is brought into engagement with and disengagement from, wherein a mesh engagement portion formed from the claw portion and the toothed portion has two stages for forward and backward rotations.

2 Claims, 18 Drawing Sheets

POWER CONNECTION/DISCONNECTION MECHANISM AND MEDIUM FEEDING APPARATUS, RECORDING APPARATUS AND LIQUID EJECTING APPARATUS

BACKGROUND OF THE INVENTION

1. Technical Field of the Invention

The present invention relates to a power connection/disconnection mechanism which connects and disconnects power by moving a clutch cover by bringing a contact portion of a lever into abutment with and separation from a projecting portion of a clutch cover so as to bring a claw portion of the clutch cover into engagement with and disengagement from a toothed portion of a gear, a medium feeding apparatus which includes the power connection/disconnection mechanism and a recording apparatus and liquid ejecting apparatus which include the medium feeding apparatus.

2. Description of the Related Art

As one of related art methods of transmitting power only at a certain timing, there exists a mechanism which connects and disconnects power by controlling a combination of a solenoid, a claw and a cam. This mechanism is made up of a solenoid, a movable claw which is joined to the solenoid at one end thereof and a cam having a recess portion which the other end of the cam is brought into engagement with and disengagement from. In addition, there is provided a gear on an outer circumferential portion of the cam, and the cam rotates together with the gear (see, for example JP-A-2000-203738).

In this mechanism, the rotation of the cam is controlled by the movement of the claw so as to connect and disconnect power, and the movement of the claw is implemented by the solenoid. When the claw is removed from the recess portion, the cam, whose rotation have been stopped until then by the claw, starts to rotate so as to transmit power, and when the claw enters the recess portion of the cam, the rotation of the cam is stopped by the claw so as to disconnect power. The connection and disconnection of power is enabled by the mechanism like this.

In the related art mechanism used to connect and disconnect power, in the event that a large reaction force Is generated on a power transmitting side, there has been a risk that a force is transmitted in an opposite direction to a driving direction at an initial stage of changeover of power, whereby the claw which has controlled the connection and disconnection of power is dislodged, leading to an event where the connection and disconnection of power is not properly implemented.

SUMMARY OF THE INVENTION

The invention was made in view of the aforesaid various problems and an object thereof is to provide a power connection/disconnection mechanism in which the claw is made difficult to be dislodged even when an external force is applied thereto by other elements and a medium feeding apparatus, a recording apparatus and a liquid ejecting apparatus. The invention is as follows:

(1). A power connection/disconnection mechanism which connects and disconnects power, comprising:

a crutch cover having: a claw portion; and a projection with which a contact portion of a lever is brought into abutment;

a gear having a toothed portion which is brought into engagement with and disengagement from the claw portion, wherein a mesh engagement portion formed from the claw portion and the toothed portion has two stages for forward and backward rotations.

(2). The power connection/disconnection mechanism according to (1), wherein a force exerted on a meshing surface of the claw portion and the toothed portion acts in a direction in which the claw portion and the toothed portion mesh with each other.

(3). The power connection/disconnection mechanism according to (1), wherein the clutch cover is rotatably supported so as to rotate in accordance with the contact portion being brought into abutment with and separation from the projection and to be brought into disengagement from and engagement with the toothed portion, and wherein the mesh engagement portion is formed such that a meshing force is directed towards a rotational center of the clutch cover.

(4). The power connection/disconnection mechanism according to (1), wherein the mesh engagement portion comprises a first mesh engagement portion for a forward rotation and a second mesh engagement portion for a backward rotation.

(5). A medium feeding apparatus which feeds a medium, comprising a power connection/disconnection mechanism according to (1).

(6). A recording apparatus which records onto a medium, comprising the medium feeding apparatus according to (5).

(7). A liquid ejecting apparatus which ejects liquid onto a target medium, comprising the medium feeding apparatus according to (5).

(8). The power connection/disconnection mechanism according to (1), wherein the mechanism further comprises: a cam clutch having a clutch cover fixing pin engaged with a clutch cover fixing hole which is provided on a rotational center of the clutch cover; and a clutch cover tension spring which imparts tension in a direction in which the clutch cover and the clutch gear are brought into mesh engagement with each other.

(9). The power connection/disconnection mechanism according to (1), wherein the claw portion comprises a first claw portion and a second claw portion, and the toothed portion comprises a first toothed portion and a second toothed portion.

(10). The power connection/disconnection mechanism according to (9), wherein the first claw portion and the first toothed portion are engaged with each other to form a first mesh engagement portion for a forward rotation, and the second claw portion and the second toothed portion are engaged with each other to form a second mesh engagement portion for a backward rotation.

(11). The power connection/disconnection mechanism according to (9), wherein the first claw portion and the second claw portion are formed on an inner circumferential surface of the clutch cover, and the projection is formed on an outer circumferential surface thereof.

(12). The power connection/disconnection mechanism according to (9), wherein the first claw portion and the second claw portion are continuously formed in an axial direction of the gear.

(13). The power connection/disconnection mechanism according to (9), wherein the first toothed portion and the second toothed portion are continuously formed in an axial direction of the gear.

BRIEF DESCRIPTION OF THE DRAWINGS

FIG. 6 is seen from the front thereof;

DETAILED DESCRIPTION OF THE INVENTION

Figure 1:
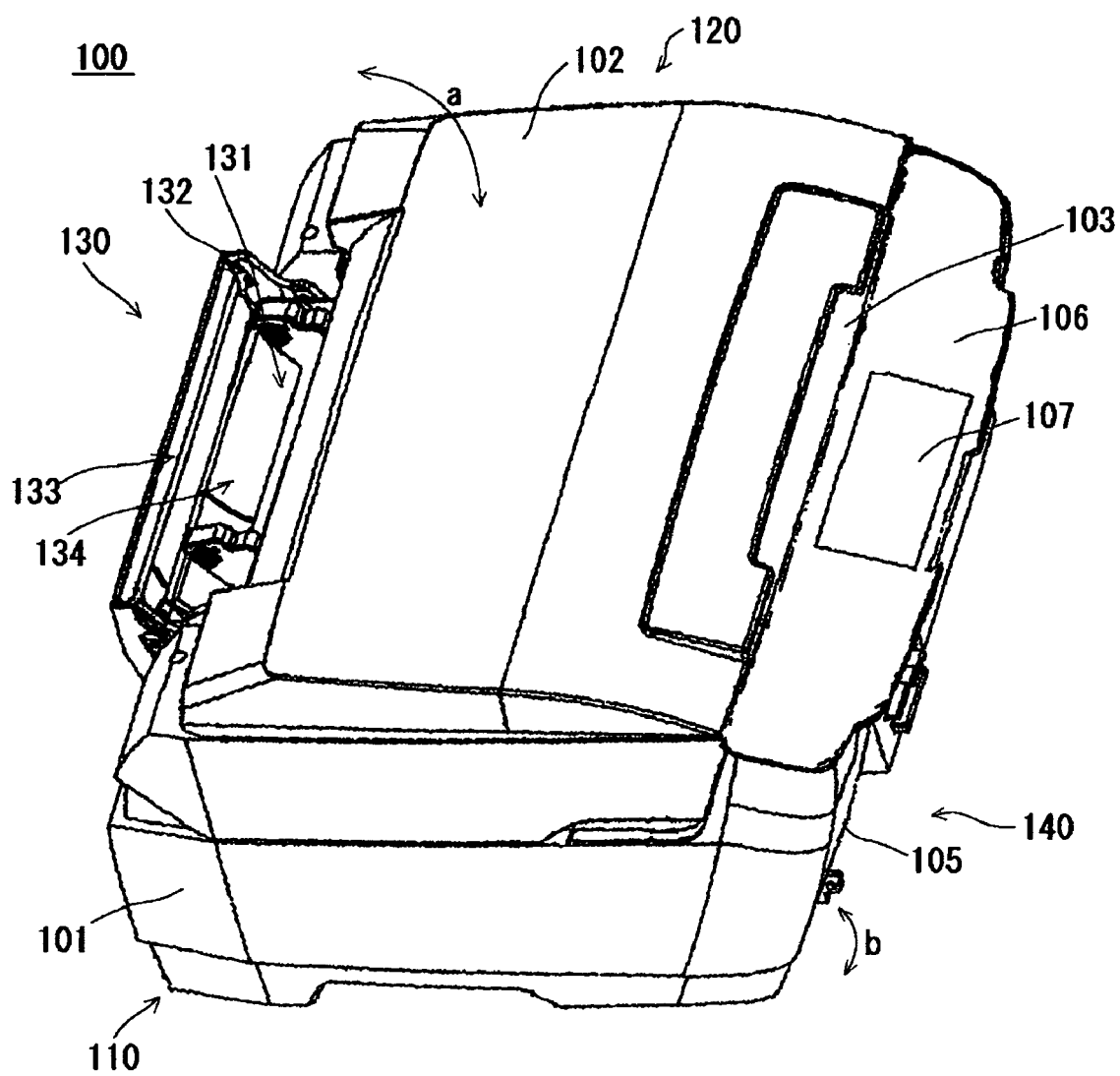
FIG. 1 is a perspective view which shows the entirety of an external configuration of an Ink-jet composite machine which is one of recording apparatuses according to an embodiment of the invention.
Figure 2:
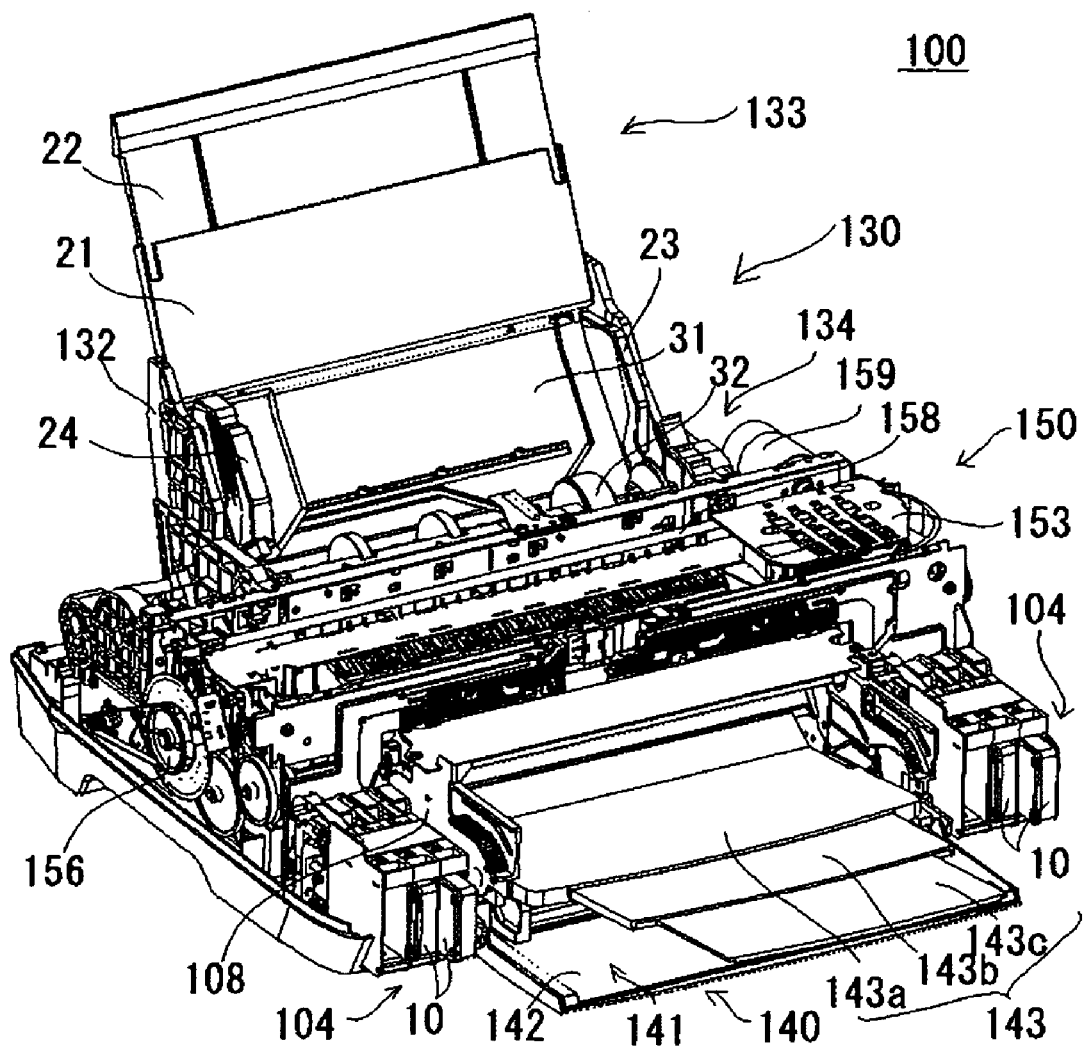
FIG. 2 is a perspective view which shows an internal construction of the composite machine shown in FIG. 1.
Figure 3:
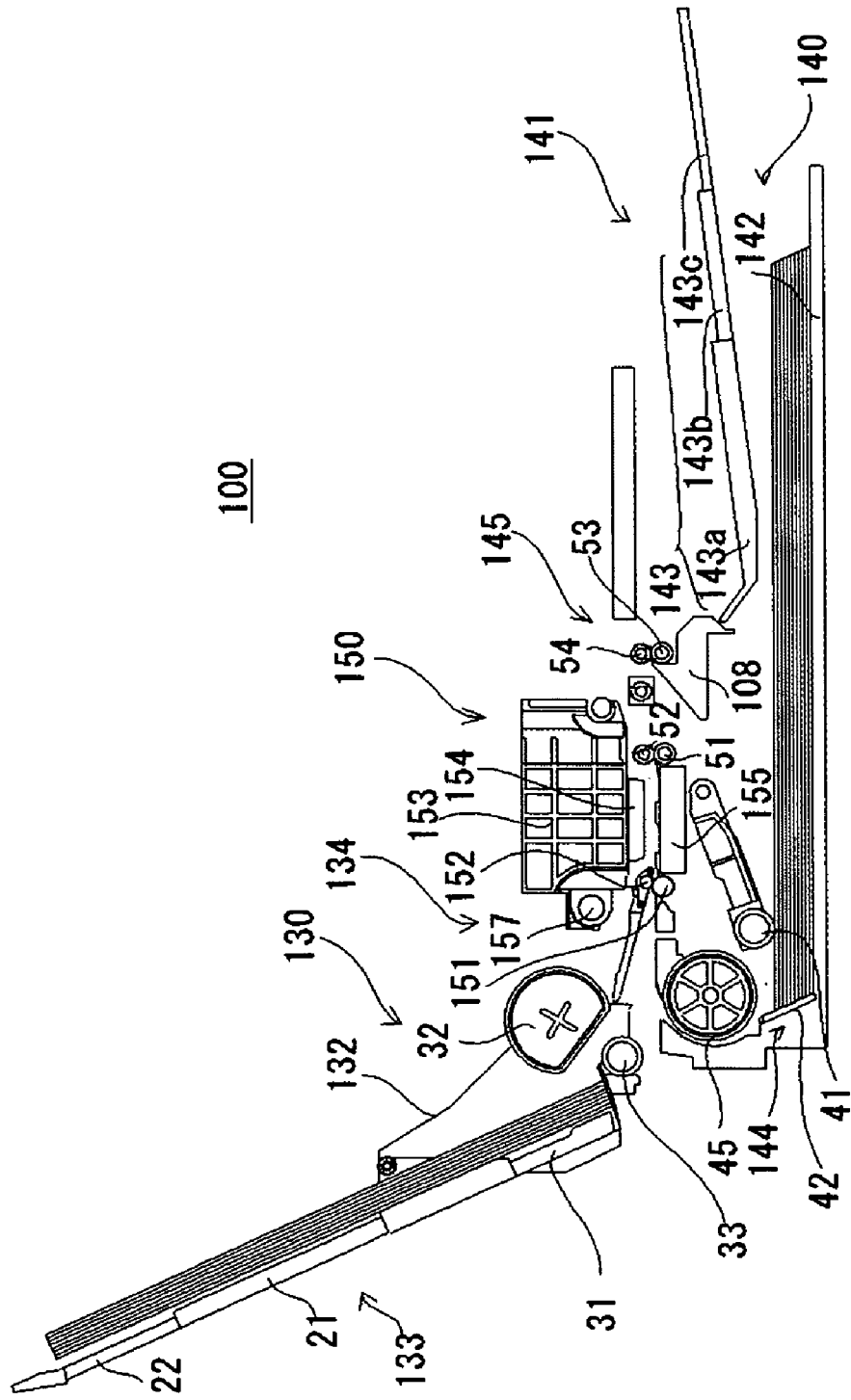
FIG. 3 is a schematic side view of the internal construction of the composite machine shown in FIG. 2.

FIG. 1 is a perspective view which shows an external overall configuration of an ink-jet composite machine which is one of recording apparatuses according to one embodiment of the invention, FIG. 2 is a perspective view which shows an internal configuration thereof and FIG. 3 is a schematic side view thereof. This ink-jet composite machine 100 includes, for example, a printer function to record on single sheets of paper in various sizes from L and A6 sizes to A4 size of JIS standard and post cards, a scanner function to read information written on sheets of paper in sizes up to A4 size of JIS standard and information written on sheets of paper in sizes up to the letter size of US standard and a copying function to make copies on sheets of paper in sizes of JIS standard such as L size, 2L size, B5 size and A4, 8 by 10, and post card.

As shown in FIG. 1, this ink-jet composite machine 100 is covered by a housing 101 which is formed substantially into a rectangular parallelepiped as a whole and includes a printer 110 at a lower stage and a scanner 120 at an upper stage thereof. Then, a sheet feeding unit 130 is provided on a rear side of the ink-jet composite machine 100 and a sheet feeding/discharging unit 140 is provided on a font side thereof which includes a power connection/disconnection mechanism which constitutes the invention. Since the user can select one or both of the front mounted sheet feeing unit 130 and the rear mounted sheet feeding/discharging unit 140 as a setting direction for a sheet before recording, the degree of freedom in selecting a setting position of the ink-jet composite machine 100 can be increased. Furthermore, since the sheet is discharged from the sheet feeding/discharging unit 140 mounted on a front side at all times after recording, the user can easily get back the recorded sheet.

A rectangular flat plate-shaped scanner cover 102 shown in FIG. 1 is provided on an upper surface of the housing 101. The scanner cover 102 has a handle 103 formed at a front portion thereof and is mounted on the housing 101 in such a manner as to be rotated about a rotational shaft at a rear portion thereof in directions indicated by arrows a in the figure. When using the scanner 120, since the user can insert the fingers underneath the handle 103 to open and close the scanner cover 102, the egress and ingress of a sheet of paper containing information to be scanned can be facilitated.

An ink cartridge accommodating portion 104 shown In FIG. 2 where a plurality of ink cartridges 10 are put in and out is formed on each side of a front of the housing 101. Each ink cartridge holds therein ink in each color for recording. Each cartridge accommodating portion 104 is covered by a transparent or translucent cartridge cover 105 shown in FIG. 1. The cartridge cover 105 is mounted in such a manner as to be rotated about a rotational shaft at a lower portion thereof. Since the user can replace ink cartridges 10 by pushing lightly the cartridge cover 105 so as to unlock a locked portion to thereby open the cartridge accommodating portion 104 without lifting up the whole of the heavy scanner 120 as has been done with the conventional counterpart, the working efficiency can be increased.

As shown in FIG. 1, a control unit 106 which indicates the operation of each of the printer 110, the scanner 120 and a copier is provided on the upper surface of the housing 101 just in front of the scanner cover 102. The control unit 106 includes; buttons, not shown, of a power system for power on/off of the machine, an operation system for paper tip positioning or ink flushing, and a processing system for e.g. image processing; and a liquid crystal panel 107 for indicating the status, and others. The user can operates the buttons and others while looking at the liquid crystal panel 107 for confirmation.

As shown in FIGS. 2 and 3, the sheet feeding/discharging unit 140, the sheet feeding unit 130 and a recording unit 150 are provided within the housing 101. A rear sheet feeding port 131 is, as shown in FIG. 1 formed in the sheet feeding unit 130 in such a manner as to open upwards in a rectangular shape, and a frame 132 is provided in such a manner as to extend along both end edges and a rear edge of the rear sheet feeding port 131. Then, as shown in FIGS. 1 to 3, a paper support 133 which supports a single sheet or a plurality of sheets to be fed and a rear auto sheet feeder (hereinafter, referred to as a rear ASF) 134 which feeds automatically sheets supported on the paper support sheet by sheet.

Figure 4:
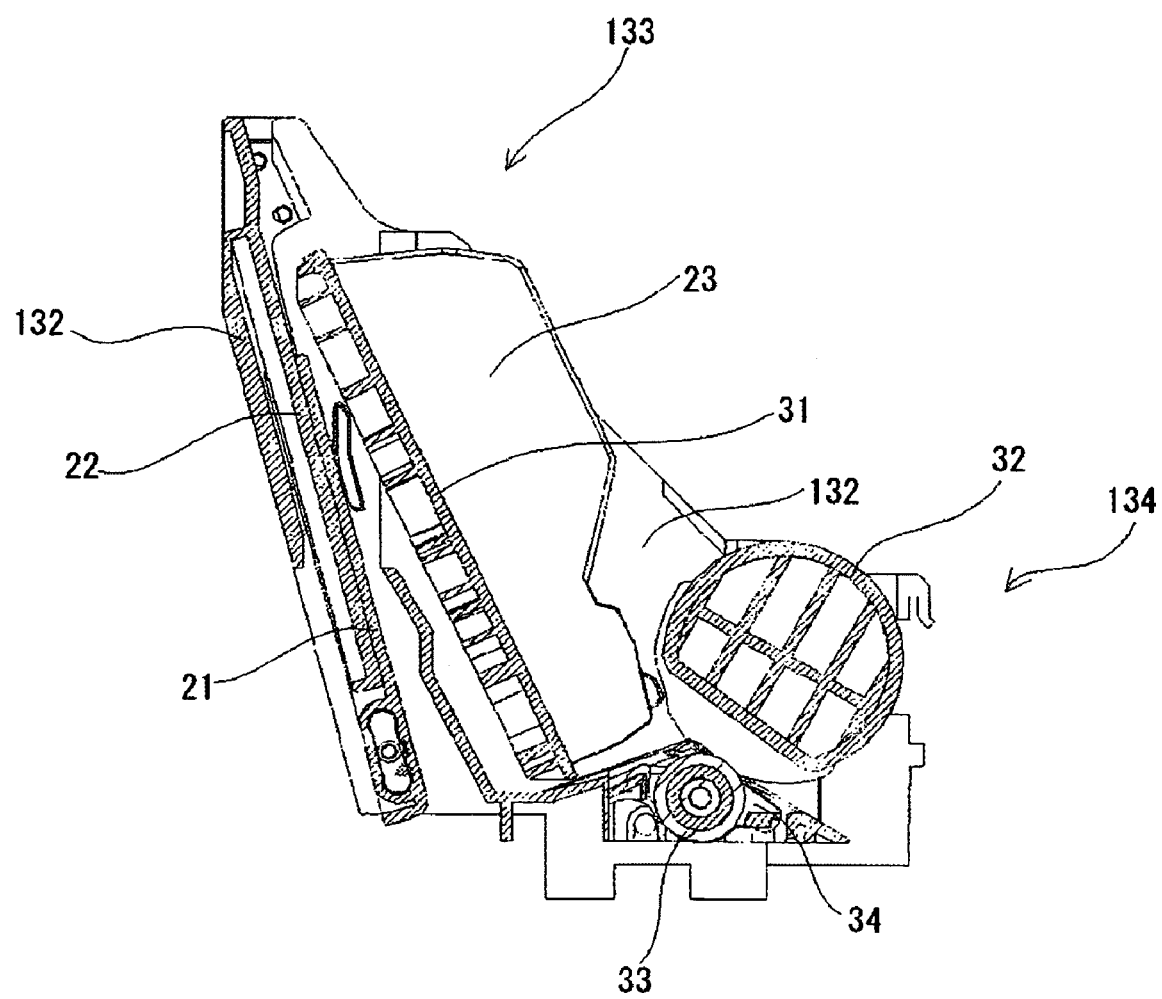
FIG. 4 is a side view which shows details of a paper support and a rear ASF (Auto Sheet Feeder) of the composite machine shown in FIG. 1.

FIG. 4 is a side view which shows in detail the paper support 133 and the rear ASF 134, and the configuration will be described with reference to FIGS. 1 to 4. The paper support 133 includes a first support and a second support which support a rear side of a sheet, as well as a stationary edge guide 23 and a movable edge guide 24 which guide both side edges of a sheet. The rear ASF 134 includes a hopper 31 which lifts up sheets supported on the paper support 133 for feeding, a sheet feeding roller 32 which takes out sheets which are lifted up by the hopper 31, a retard roller 33 which separates a top sheet of sheets fed by the sheet feeding roller 32 in a superposed state from the other sheets so that only the top sheet can be fed and a sheet returning unit 34 which returns to the hopper 31 the remaining sheets which are separated by the retard roller 33.

The first support 21 is formed into a flat plate shape and is provided in such a manner as to be freely stowed into and pulled out of an inside of a rear wall of the frame 132, and the second support 22 is formed into a flat plate shape and is provided in such a manner as to be freely stowed into and pulled out of the first support 21. Since the first support 21 and the second support 22 are formed In such a manner as to be freely extended and contracted in a sheet feeding direction, the supports can be stowed compact when not in use, whereas when in use, they can support sheets in various sizes in an ensured fashion.

In addition, the stationary edge guide 23 is formed integrally with the hopper 31 into a shape which follows a right side wall of the frame 132 when viewed from the front of the machine, and the movable edge guide 24 is formed into a shape which follows a left side wall of the frame when viewed from the front of the machine and is mounted on the hopper 31 in such a manner as to move substantially in parallel with the rear wall of the frame 132 between the left side wall and the right side wall thereof. Since the stationary edge guide 23 and the movable edge guide 24 can guide both side edges of sheets in an ensured fashion even in case the sheets are different in size, the feeding of sheets can be implemented with high accuracy.

The hopper 31 is formed into a flat plate shape so that sheets can be placed thereon and is provided substantially in parallel with the rear wall of the frame 132 such that a lower end is situated in the vicinity of the sheet feeding roller 32 and an upper end thereof is situated close to a top portion of the rear wall of the frame 132. Then, a compression spring, not shown, which is connected to the rear wall of the frame 132 at one end thereof is connected to a rear side of a lower end of the frame 132 at the other end thereof, whereby the hopper 31 is provided in such a manner as to rotate at the lower end about the upper end thereof by virtue of the extension and contraction of the compression spring.

The sheet feeding roller 32 is formed into a D-shape by being cut partially circumferentially and is provided in the vicinity of the lower end of the hopper 31 in such a manner as to rotate intermittently so as to friction feed sheets which are lifted up by the hopper 31, The retard roller 33 is provided in such a manner as to be brought into abutment with the sheet feeding roller 32 so as to friction separate a top sheet from a sheet thereunder when sheets are fed by the sheet feeding roller 32 in a superposed fashion. The rear sheet returning unit 34 is formed into a claw shape and is disposed in the vicinity of the sheet feeding roller 32 so as to catch the remaining sheet separated from the top sheet by the retard roller 33 on a claw formed thereon to thereby return it to the hopper 31.

As shown in FIGS. 2 and 3, a front sheet feeding/discharging port 141 is formed in the sheet feeding/discharging unit 140 in such a manner as to open forwards in a rectangular shape, and a supply sheets tray 142 is provided below the front sheet feeding/discharging port 141, a discharged sheets tray 143 being provided above the supply sheets tray 142. Then, a front auto sheet feeder (hereinafter, referred to as a front ASF) 144, which is provided with a mechanism characteristic of the invention in which sheets stocked in the supply sheets tray 142 are automatically fed sheet by sheet, and a front sheet discharging mechanism (hereinafter, referred to as a front EJ) 145 which automatically discharges fed sheets to the discharged sheets tray 143 are provided deep into the front sheet feeding/discharging port 141.

The supply sheets tray 142 is, as shown in FIGS. 2 and 3, formed into a flat plate shape, and sheets to be fed for recording are designed to be stacked for stock on an upper surface thereof. The discharged sheets tray 143 includes, as shown in FIGS. 2 and 3, a first tray 143a, a second tray 143b and a third tray 143c. The first tray 143a is formed into a flat plate shape and is provided on a main body frame 108 which resides deep in the sheet feeding/discharging unit 140 in such a manner as to rotate at a rear portion thereof, the second tray 143b is formed into a flat plate shape and is provided in such a manner as to be freely stowed into and pulled out of the first tray 143a, and the third tray 143c is formed into a flat plate shape and is provided in such a manner as to be freely stowed Into and pulled out of the second tray 143b.

The discharged sheets tray 143 is made such that discharged sheets after recording are stacked in place on an upper surface thereof in such a state that the second tray 143b and the third tray 143c are pulled out. Since the second tray 143b and the third tray 143c are formed in such a manner as to be freely extended and contracted in a sheet discharging direction, the trays can be stowed compact when not in use. In addition, when in use, the trays allow discharged sheets in various sizes to be stacked in place thereon in an ensured fashion. Note that the sheet feeding/discharging unit 140 is also formed such that a tray which stores therein thick sheets that cannot be bent when fed and discharged or optical discs is manually inserted thereinto for feeding.

Figure 5:
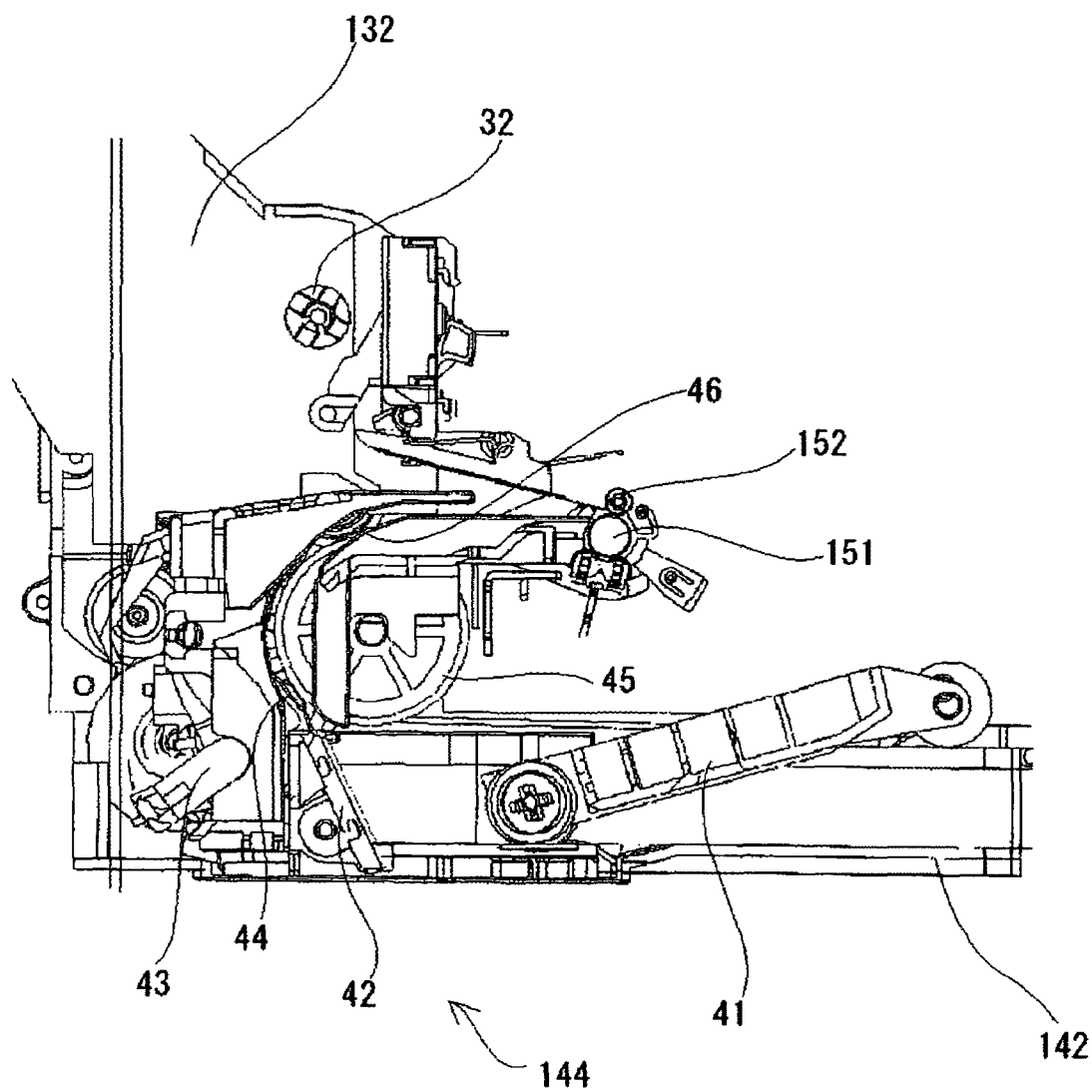
FIG. 5 is a side view which shows details of a front ASF of the composite machine shown in FIG. 1.

FIG. 5 is a side view which shows in detail the front ASF 144 which is provided with the mechanism characteristic of the invention, and the description continues by reference to FIGS. 3 and 5. The front ASF 144 includes a pick-up roller unit 41 which takes out sheets stored in the supply sheets tray 142 and a bank portion 42 which alters the direction of a sheet that is taken out by the pickup roller unit 41. The front ASF 144 includes further a retard roller unit 43 which separates a top sheet of sheets fed by the pick-up roller unit 41 in a superposed state from a sheet thereunder so that only the top sheet can be fed further, a front sheet returning unit 44 which returns to the supply sheets tray 142 the remaining sheets which are so separated by the retard roller unit 43, an intermediate roller 45 which reverses a sheet being fed in a U-shape and an assist roller 46.

The pick-up roller unit 41 is disposed above a rear portion of the supply sheets tray 142 and is provided In such a manner as to freely swing in vertical directions with respect to the supply sheets tray 142 so as to friction feed sheets stored in the supply sheets tray 142 when lowered. The bank portion 42 is provided in such a manner as to be inclined rearwards at the rear portion of the supply sheets tray 142 so as to alter the direction of sheets fed by the pick-up roller unit 41 such that distal ends of the sheets so fed are directed upwards thereat.

The retard roller unit 43 is provided in such a manner as to be brought into abutment with the intermediate roller 45, whereby when sheets are fed by the pick-up roller unit 41 in a superposed state, a top sheet of the superposed sheets is friction separated from a sheet thereunder so that only the top sheet can be fed further. The front sheet returning unit 44 is formed into a claw shape and is provided in the vicinity of the retard roller unit 43 so as to catch the remaining sheets under the top sheet so separated on a claw formed thereon to return them to the supply sheets tray 142. The assist roller 46 is provided in such a manner as to be in abutment with the intermediate roller 45 at all times so as to hold the top sheet separated by the retard roller unit 43 between the intermediate roller 45 and itself to thereby reverse the top sheet so held in the U-shape to be fed further to a platen 155.

The front EJ 145 includes, as shown in FIG. 3, a first sheet discharging roller 51 and a first serrated roller 52, and a second sheet discharging roller and a second serrated roller 54. The first sheet discharging roller 51 is provided on a downstream side of the platen 155 in a sheet carrying direction so as to hold a sheet that has passed through the platen 155 together with the first serrated roller 52 for discharge, and the second sheet discharging roller 53 is provided downstream of the first sheet discharging roller 51 in the sheet carrying direction so as to hold the sheet discharged by the first sheet discharging roller 51 together with the second serrated roller 54 for discharge on to the discharged sheets tray 143.

As shown in FIG. 3, provided in the recording unit 150 are a sheet feeding roller 151 which feeds a sheet in an auxiliary scanning direction in synchronism with a recording operation and a follower roller 152 thereof, a carriage 153 which moves in a main scanning direction in synchronism with a recording operation, a recording head 154 which discharges ink in synchronism with a recording operation and the platen 155 which holds a sheet flat at the time of recording.

The sheet feeding roller 151 is, as shown in FIG. 3, provided on an upstream side of the platen 155 in the sheet carrying direction and is adapted to feed out by a sheet feeding mechanism 156 shown in FIG. 2 a sheet that is fed by the sheet feeding roller 32 or a sheet that is reversed to be fed by the intermediate roller 45 on to the platen 155 while holding the sheets together with the follower roller 152. The carriage 153 is installed on a carriage guide shaft 157 shown in FIG. 3 in such a manner that the carriage guide shaft 157 extends through the carriage 153 above the platen 155 and is connected to a carriage belt 158 shown in FIG. 2 such that, when the carriage belt 158 is activated by a carriage motor 159 shown in FIG. 2, the carriage 153 is entrained by the movement of the carriage belt 158 to thereby reciprocate along the carriage guide shaft 157 while being guided thereby.

The recording head 154 is, as shown in FIG. 3, installed on the carriage 153 in such a manner as to define a predetermined space with respect to the platen 155 and includes, for example, a black ink recording head which discharges a black ink and a plurality of color ink recording heads which discharge inks in five colors such as yellow, cyan, light cyan, magenta, and light magenta. Then, the recording head 154 has provided therein a pressure generating chamber and a nozzle opening connected to the pressure generating chamber, and ink is reserved in the pressure generating chamber and is pressurized under a predetermined pressure, whereby ink is discharged from the nozzle opening towards a sheet in droplets whose size is controlled. Next, the front ASF 144 provided with the mechanism characteristic of the invention will further be described by reference to the drawings.

Figure 6:
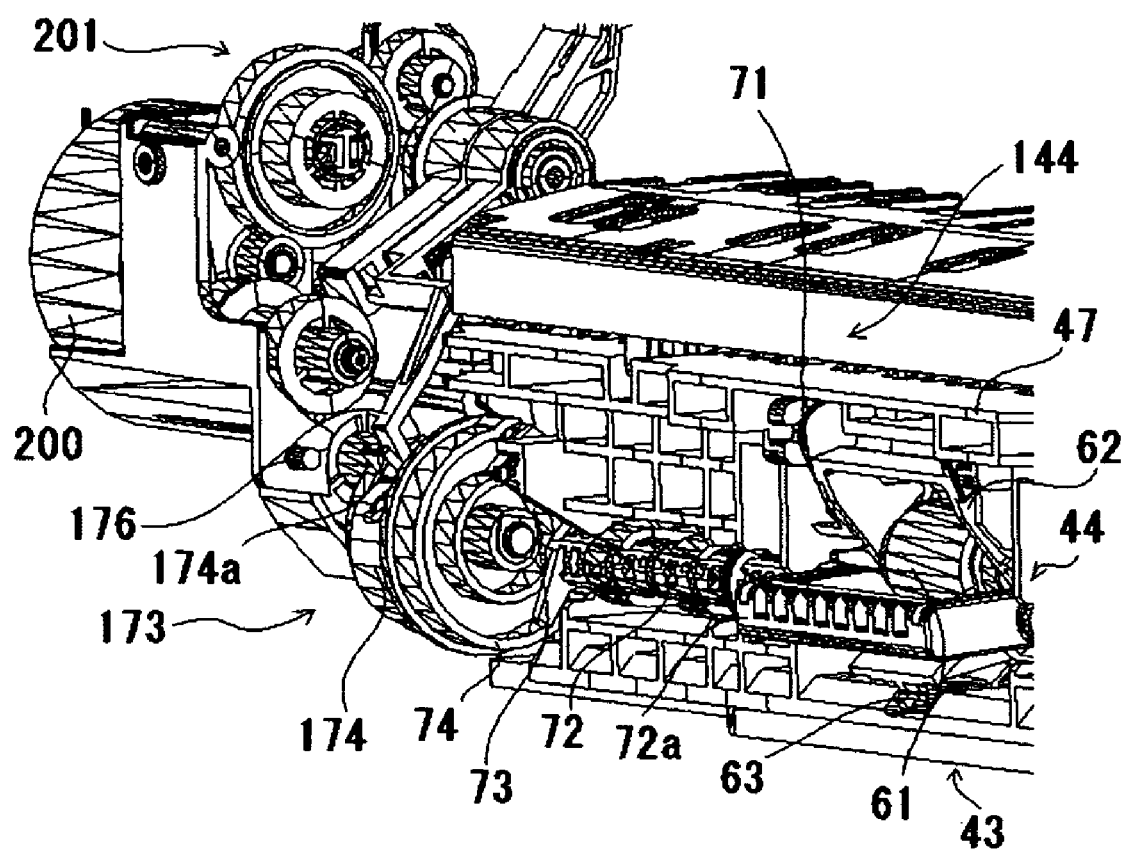
FIG. 6 is a perspective view which shows details of a main part of FIG. 5 as viewed from the back thereof.
Figure 7A:
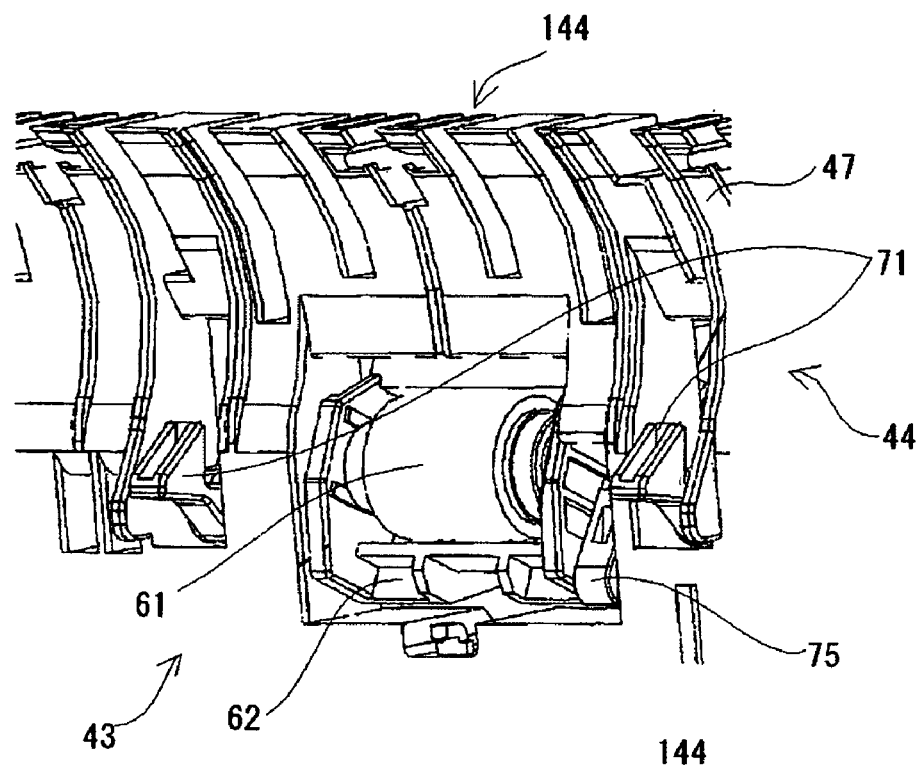
FIGS. 7A and 7B are perspective views when
Figure 7B:
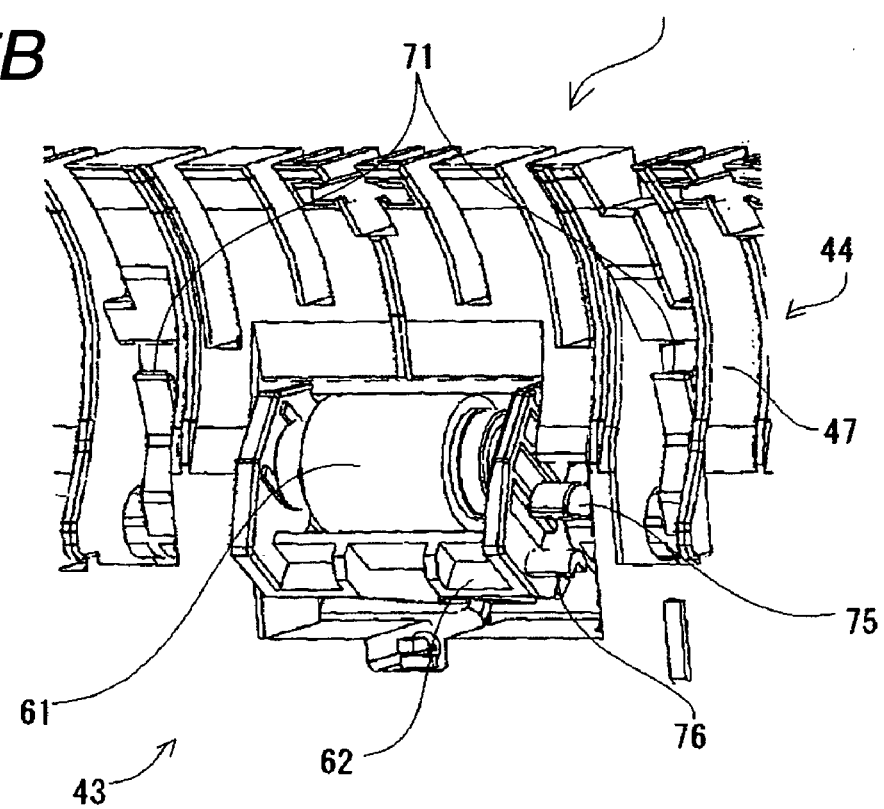
Figure 8:
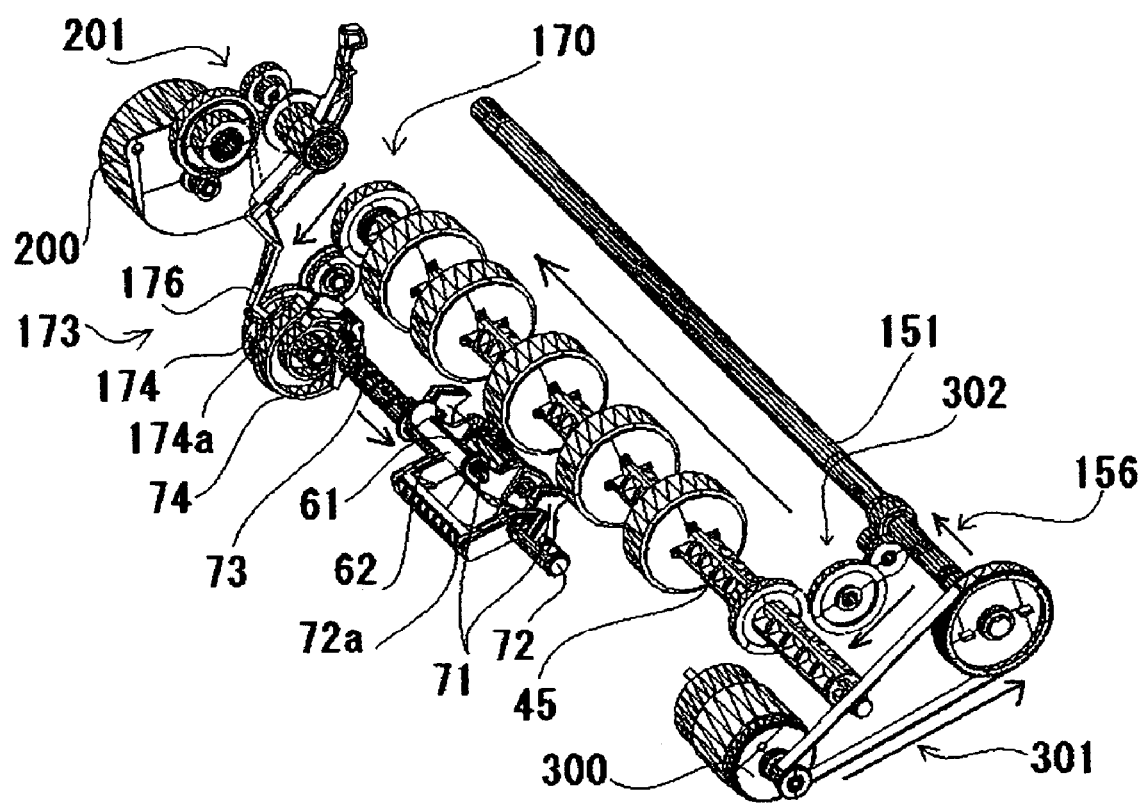
FIG. 8 is a perspective view which shows all constituent components which make up a power transmission path of the front ASF In such a state that all the constituent components are removed from the front ASF.

FIG. 6 is a perspective view of details of a main part of the front ASF 144 as seen from a rear side thereof, FIG. 7 shows perspective views of the main part of the front ASF 144 as seen from a front side thereof, and FIG. 8 is a perspective view which shows all elements making up a power transmission path of the front ASF 144 in such a state that the elements are removed therefrom. The front ASF 144 includes the retard roller unit 43 which separates a top sheet of sheets fed by the pick-up roller unit 41 in a superposed state from a sheet thereunder so that only the top sheet can be fed further, the front sheet returning unit 44 which returns to the supply sheets tray 142 the remaining sheets which are so separated by the retard roller unit 43, and a clutch mechanism 173 characteristic of the invention which connects and disconnects power to the retard roller unit 43 and the front sheet returning unit 44.

The retard roller unit 43 includes a retard roller 61 which is brought into abutment with the intermediate roller 45 shown in FIG. 5 so as to separate a top sheet from sheets fed in a superposed state from a sheet thereunder so that only the top sheet so separated can be fed further and a roller holder 62 which supports rotatably the retard roller 61 in such a manner as to bring the retard roller 61 into abutment with and separation from the intermediate roller 45. The retard roller 61 is formed into a cylindrical shape and is covered by, for example, rubber around a circumferential surface thereof in order to enhance the friction coefficient. The roller holder 62 supports rotatably the retard roller 61 at one end thereof and is supported rotatably on a frame 47 at the other end thereof, whereby the roller holder 62 is made to swing freely about the other end at the one end thereof, that is, the roller holder 62 holds the retard roller 61 in such a manner as to swing freely. In addition, the retard roller 61 is fixed by the roller holder 62, and the roller holder 62 is locked by a retard roller tension spring 63 which imparts a clockwise tension between the frame 47 and itself at all times.

The front sheet returning unit 44 includes a sheet return 71 which abuts a distal end of the sheet that is separated from the top sheet under which it resided by the retard roller 61 to push return the sheet, a sheet return shaft 72 which turns the sheet return 71 and swings the retard roller 61, a cam follower 73 shown in FIGS. 6 and 8 which transmits a drive force from a PF motor 300 to the sheet return shaft 72 and a cam clutch 74.

The sheet return 71 is formed into claws which are formed integrally on the sheet return shaft 72 in such a manner as to project therefrom at sides of the retard roller 61. The cam follower 73 is formed into an L-shape and is formed integrally on the sheet return shaft 72 in such a manner as to project from one end of the sheet return shaft 72. The cam clutch 74 is supported rotatably on the frame 47 and is formed into a shape which allows the cam clutch 74 to be brought into abutment with and separation from the cam follower 73 so as to rotate the sheet return shaft 72 intermittently. It is the clutch mechanism 73, characteristic of the invention, which connects and disconnects power to and from the cam clutch 74. This clutch mechanism 173 can change over, as required, the connection and disconnection of power transmitted from the PF motor 300 by means of a trigger lever 176 (a lever).

The sheet return shaft 72 is supported rotatably on the frame 47. Here, as has been described above, since the sheet return 71 is situated on the sides of the retard roller 61, in the event that the sheet return shaft 72 is formed into a straight rod shape, the sheet return shaft 72 will interfere with the roller holder 62. To cope with this, as shown in FIG. 8, a portion 72a of the sheet return shaft 72 which interferes with the roller holder 62 is formed into a crank shape so as to avoid the interference with the roller holder 62.

The sheet return shaft 72 further has a function to turn the sheet return 71 and a function to swing the retard roller 61. Due to this, a retarder cam 75 is, as shown in FIG. 7, formed integrally on the sheet return shaft 72 for turning the roller holder 62, and a retarder cam follower 76 is integrally formed on the roller holder 62 in such a manner as to be brought into abutment with and separation from the retarder cam 75. By forming the crank 72a on the sheet return shaft 72, the sheet return 71 and the retarder cam 75 in such a manner as to adjust the phases thereof, the sheet return 71 can be turned without interfering with the roller holder 62 and the retard roller 61 can be swung, when the sheet return shaft 72 is rotated.

The power transmission path of the front ASF 114 shown in FIG. 8 will be described. Firstly, power generated at the PF motor 300 which constitutes a power supply is transmitted to the sheet feed roller 151 by a transmission belt mechanism 301 of the sheet fading mechanism 156. Next, the power at the sheet feeding roller 151 is transmitted to the intermediate roller 45 by a composite gear mechanism 302, and the power transmitted to the intermediate roller 45 is then transmitted to a clutch gear 175 via a composite gear mechanism 170.

Then, the power is connected and disconnected by the clutch mechanism 173. Namely, the power can be connected and disconnected to and from the sheet return shaft 72 via the cam clutch 74 and the cam follower 73 by bringing the trigger lever (the lever) of the clutch mechanism 173 into contact with a clutch cover projecting portion 174a as required. In addition, the power connecting and disconnecting trigger lever (the lever) 176 operates when power generated at an ASF motor 200 is transmitted thereto from a composite gear mechanism 201. Then, the power transmitted from the sheet return shaft 72 is transmitted to the retarder cam 75 to thereby put the retard roller 61 and the sheet return 71 into operation. Next, the details of the clutch mechanism 173 will be described by reference to the drawings.

Figure 9:
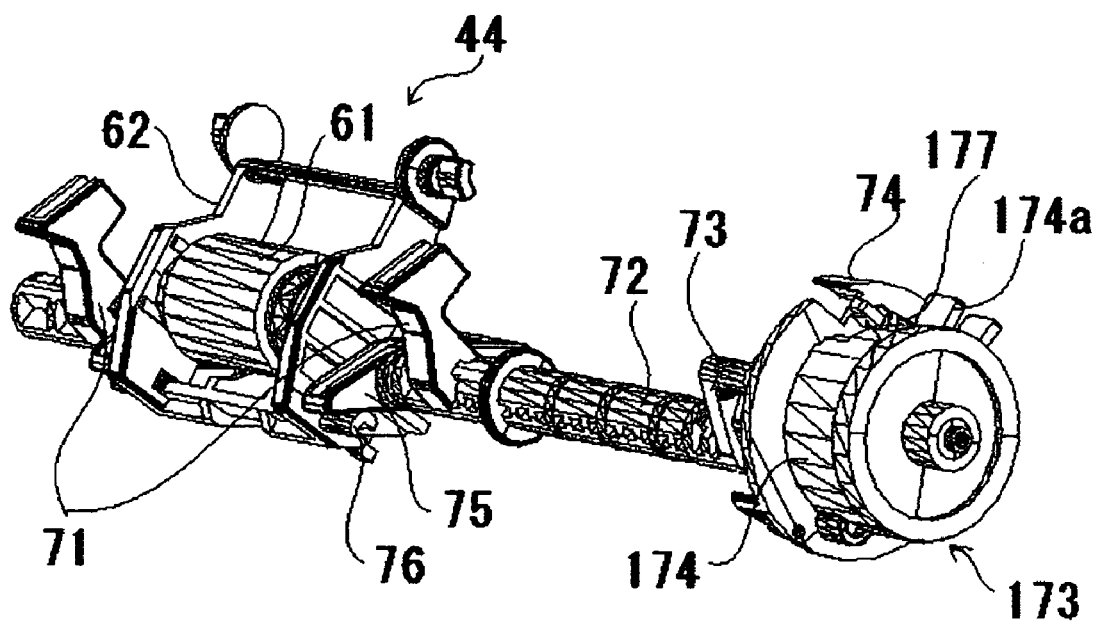
FIG. 9 is a perspective view which shows details of a clutch mechanism characteristic of the invention and the periphery thereof.
Figure 10:
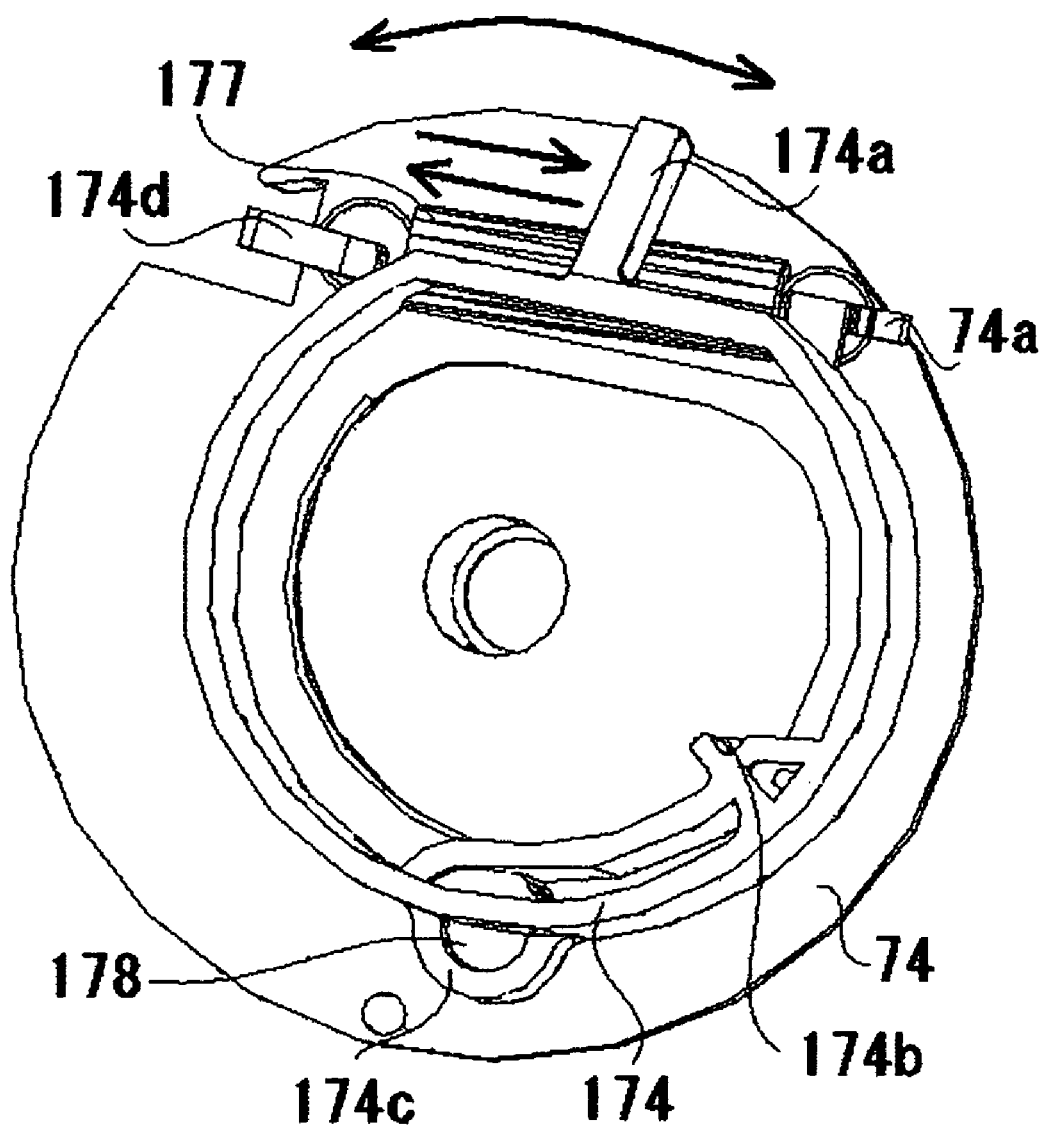
FIG. 10 is a first perspective view which shows respective components of the clutch mechanism which are disassembled therefrom.
Figure 11:
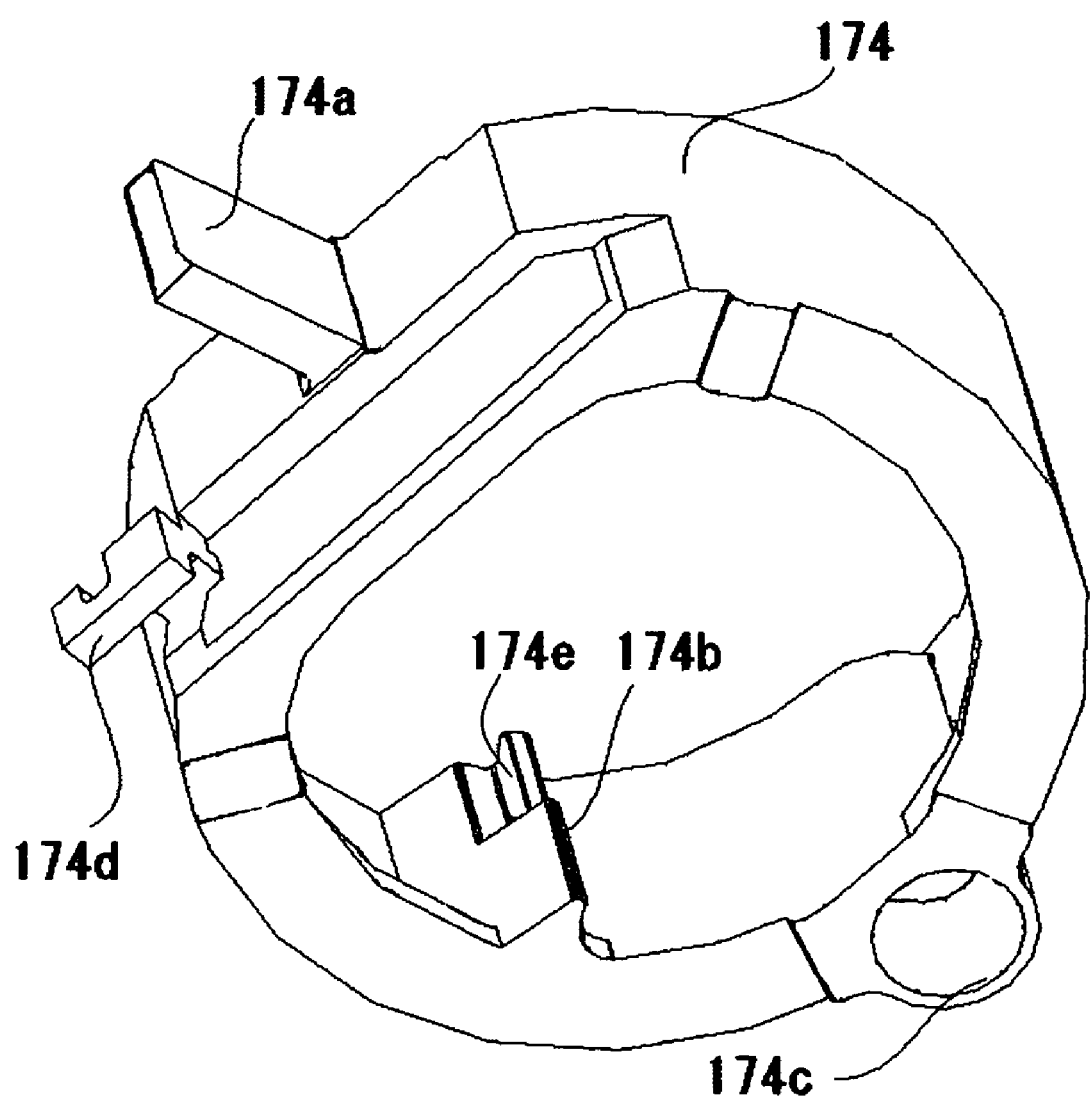
FIG. 11 is a second perspective view which shows one disassembled component of the clutch mechanism.
Figure 12:
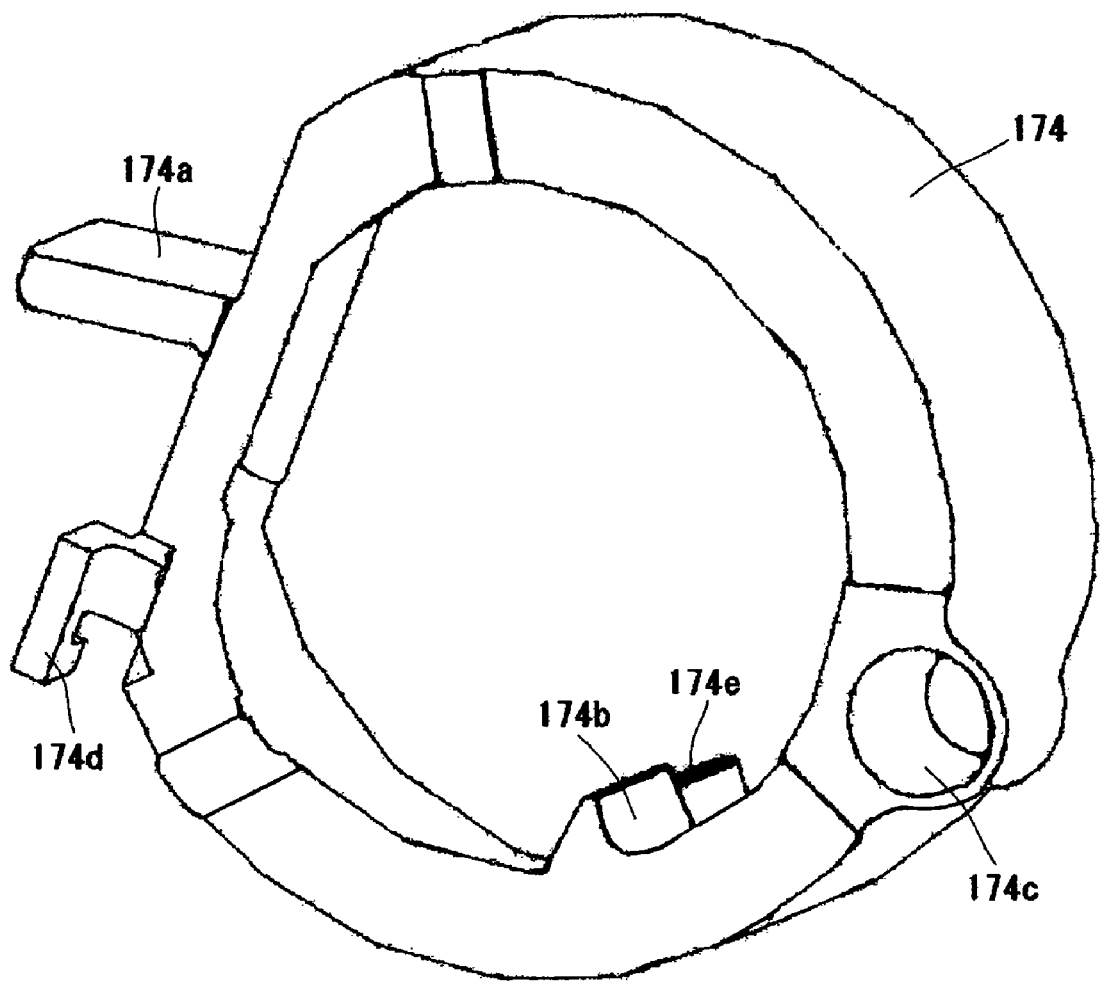
FIG. 12 is a third perspective view which shows the one disassembled component of the clutch mechanism.
Figure 13:
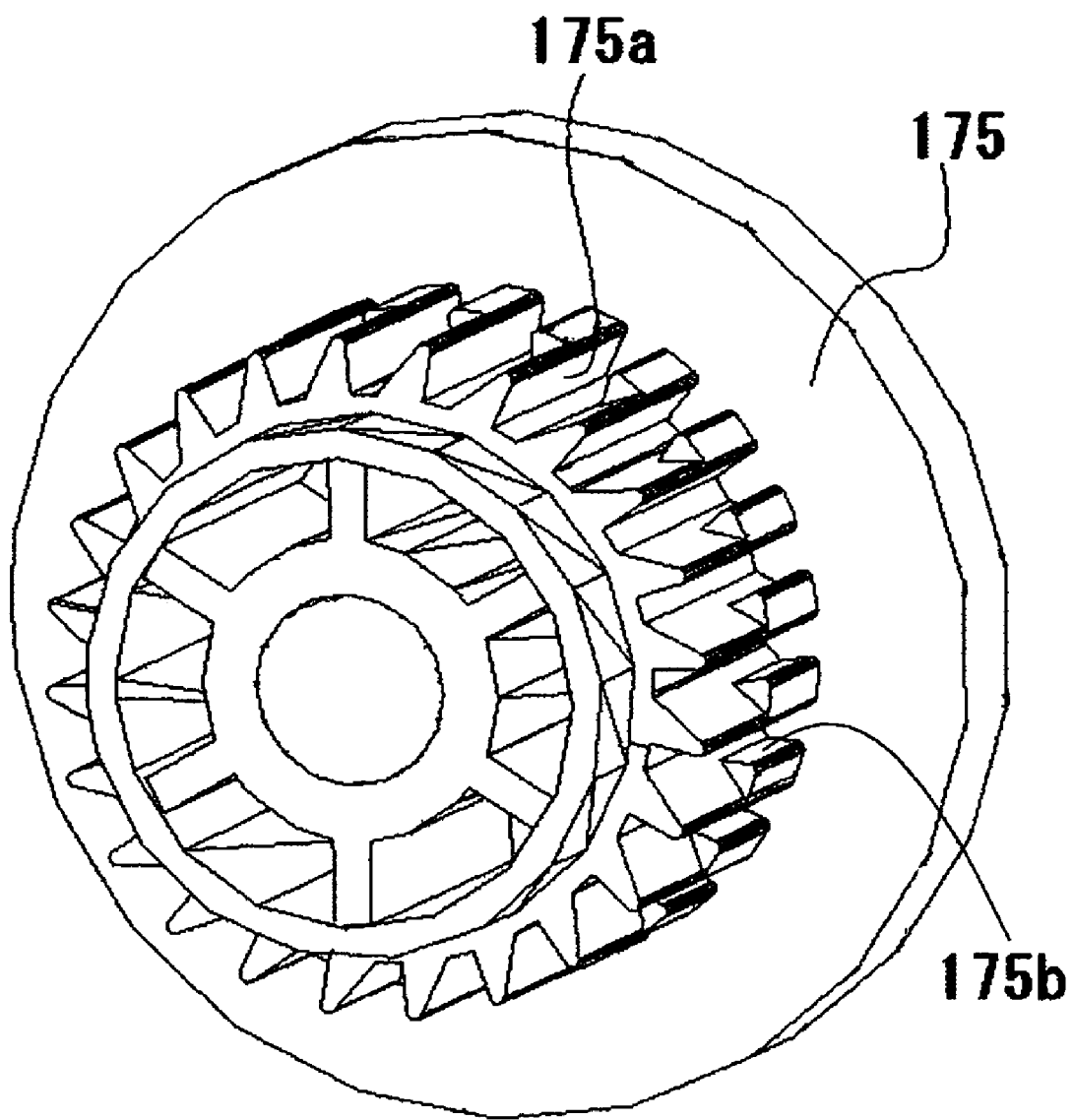
FIG. 13 is a fourth perspective view which shows another disassembled component of the clutch mechanism.

FIG. 9 is a perspective view which shows the details and periphery of the clutch mechanism 173 which is characteristic of the invention, and FIGS. 10 to 13 are perspective views of respective constituent elements disassembled from the clutch mechanism 173. FIG. 10 is a drawing which shows a state in which a clutch cover and the cam clutch are fixed, FIGS. 11 and 12 are perspective views which show the details of the clutch cover, and FIG. 13 is a perspective view which shows the details of a clutch gear.

As shown in FIGS. 8 and 9, the clutch mechanism 173 includes a clutch cover 174 locked on the cam clutch 74, a clutch cover tension spring 177 which locks the clutch cover 174 on the cam clutch 74, the trigger lever (the lever) 176 which changes over the connection and disconnection of power and the clutch cover projecting portion 174a. A specific flow of connection and disconnection of power by the clutch mechanism 173 will be described later on by reference to the drawings.

As shown in FIGS. 10 and 11, the clutch cover 174 is provided in parallel with the cam clutch 74 and is locked on the cam clutch 74 rotatably by a clutch cover fixing hole 174c residing at a rotational center of the clutch cover 174 and a clutch cover fixing pin 178. In addition, the clutch cover tension spring 177 is locked on the clutch cover 174 and the cam clutch 74 at a clutch side compression spring mounting portion 174d and a cam side compression spring mounting portion 74a which are provided on the clutch cover 174 and the cam clutch 74, respectively. This clutch cover tension spring 177 imparts a tension in a direction in which the clutch cover 174 and a clutch gear 175, which will be described later on, are brought into mesh engagement with each other.

Note that as to the fixing method of the clutch cover 174, other fixing methods than the fixing method using the clutch cover fixing pin 178 can be considered which includes, for example, a method in which a rail member is prepared in a direction which is parallel with a direction in which the clutch is brought into engagement so as to move the clutch cover 174 in parallel. This is the method in which the clutch cover 174 is fixed to the rail member and is further surrounded by a circular member around an outer circumference thereof, so that the trigger lever 176 is brought into abutment with and separation from the outer circumferential portion so formed.

As shown in FIGS. 12 and 13, the clutch cover 174 includes the clutch cover projecting portion 174a, a first clutch cover claw portion 174b, the clutch cover fixing hole 174c, the clutch side compression spring mounting portion 174d and a second clutch cover claw portion 174e which is characteristic of the invention. In addition, the clutch gear 175 includes a first clutch gear toothed portion 175a with which the first clutch cover claw portion 174b is brought into mesh engagement and a second clutch gear toothed portion 175b which is also characteristic of the invention.

The clutch cover projecting portion 174a is brought into abutment with and separation from the trigger lever (the lever) 176. The first clutch cover claw portion 174b is brought into mesh engagement with the clutch gear portion 175a so as to connect and disconnect power. The clutch cover fixing pin 178 is inserted into the clutch cover fixing hole 174c. The one end of the clutch cover tension spring 177 is locked on the clutch cover joining claw 174d. Then, the second clutch cover claw portion 174e, which is characteristic of the invention, is formed in parallel with the first clutch cover claw portion 174b. In addition, the first clutch gear toothed portion 175a is brought into mesh engagement with the first clutch cover claw portion 174b for connection and disconnection of power. Then, the second clutch gear toothed portion 175b, which is also characteristic of the invention, is formed in parallel with the first clutch gear toothed portion 175a. This second clutch gear toothed portion 175b is, as has been described previously, brought into mesh engagement with the second clutch cover claw portion 174e and is formed so as to have a second mesh engagement portion where the second clutch gear toothed portion 175b meshes with the second clutch cover claw portion 174e in an opposite direction to the direction of a first mesh engagement portion at which the first clutch gear toothed portion 175a meshes with the first clutch cover claw portion 175b.

The first mesh engagement portion between the first clutch cover claw portion 174b and the first clutch gear toothed portion 175a is characterized by a configuration in which power can be transmitted in a forward direction but is disconnected in a reverse or backward direction. In addition, the second mesh engagement portion between the second clutch cover claw portion 174e and the second clutch gear toothed portion 175b is characterized by a configuration in which power can be transmitted in the reverse or backward direction but is disconnected in the forward direction. By this configurations, the clutch mechanism 173 is formed into a two-stage configuration for forward and reverse rotations which connects and disconnects power as required through the operation of the trigger lever (the lever) 176 and the PF motor 300.

In addition, while a reason will be described later on, being made to match the first clutch gear toothed portion 175a of the clutch gear 175, the first clutch cover claw portion 174b is also made into a configuration which facilitates the abutment and separation thereof with and from the first clutch gear toothed portion 175a and is further made to mesh therewith. Next, a method will be described in detail by reference to the drawings in which power is connected and disconnected by the clutch mechanism 173.

Figure 14:
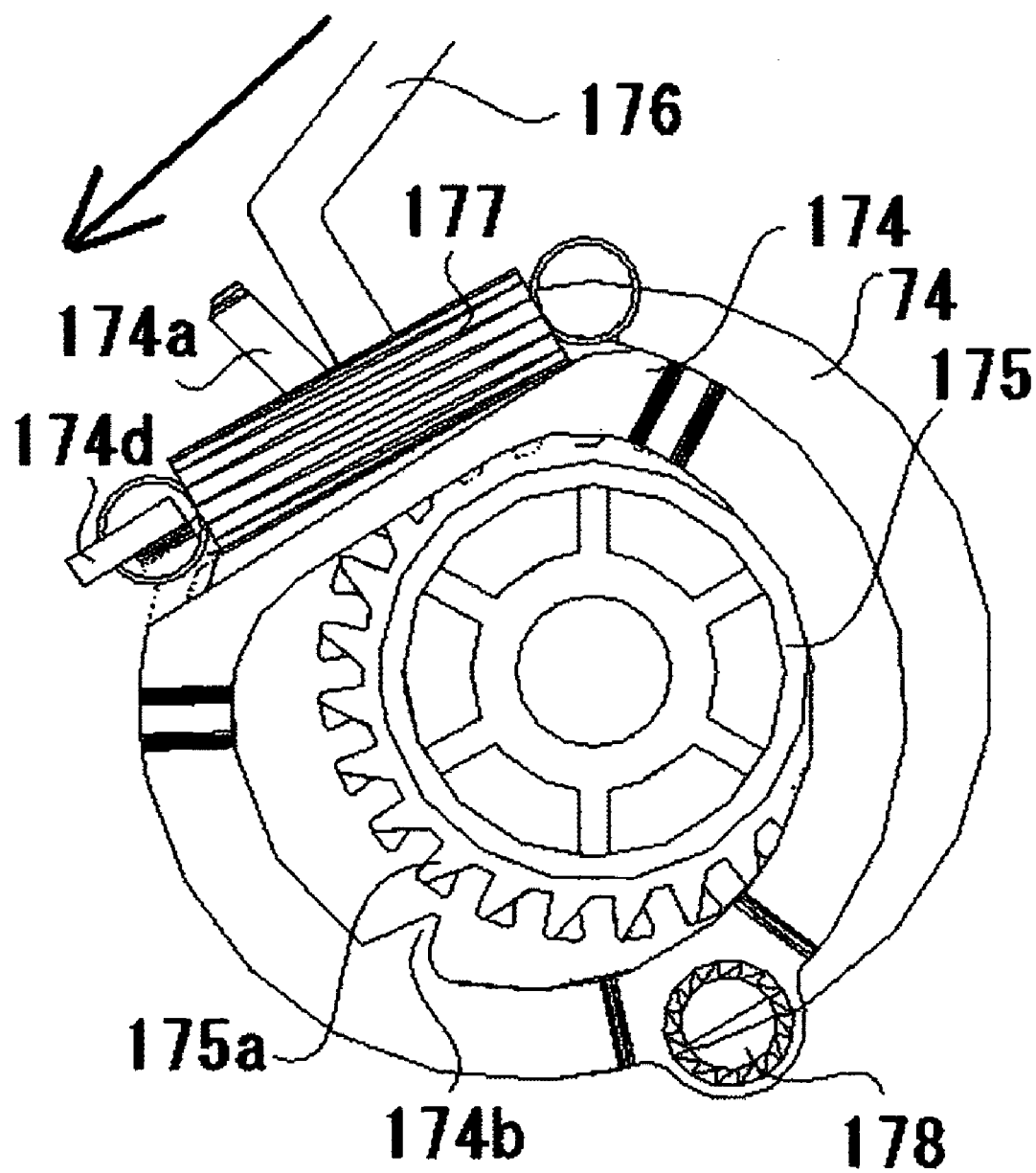
FIG. 14 is a view which explains an operation of the clutch mechanism in a standby state.
Figure 15:
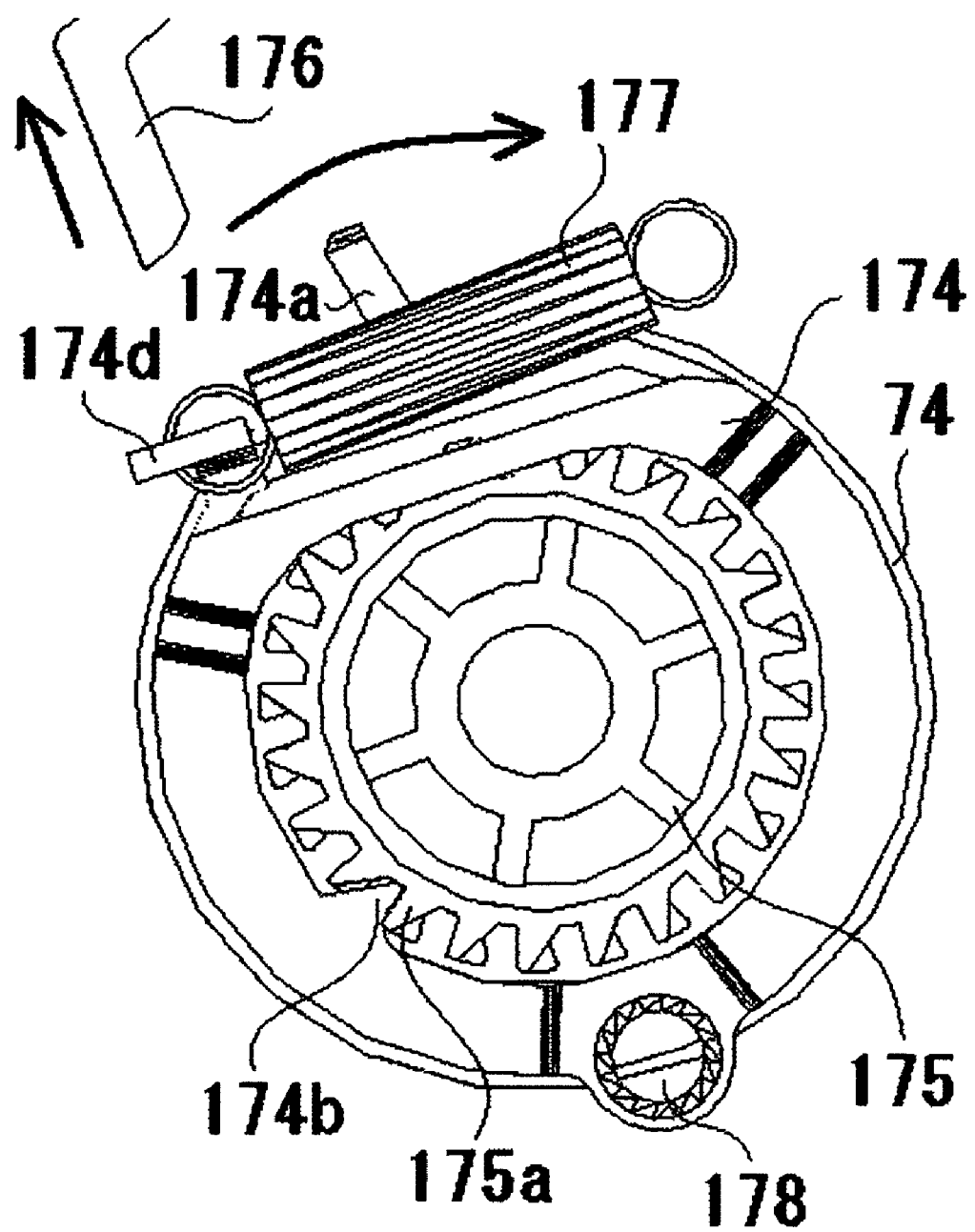
FIG. 15 is a view which explains an operation of the clutch mechanism in a driving state.
Figure 16:
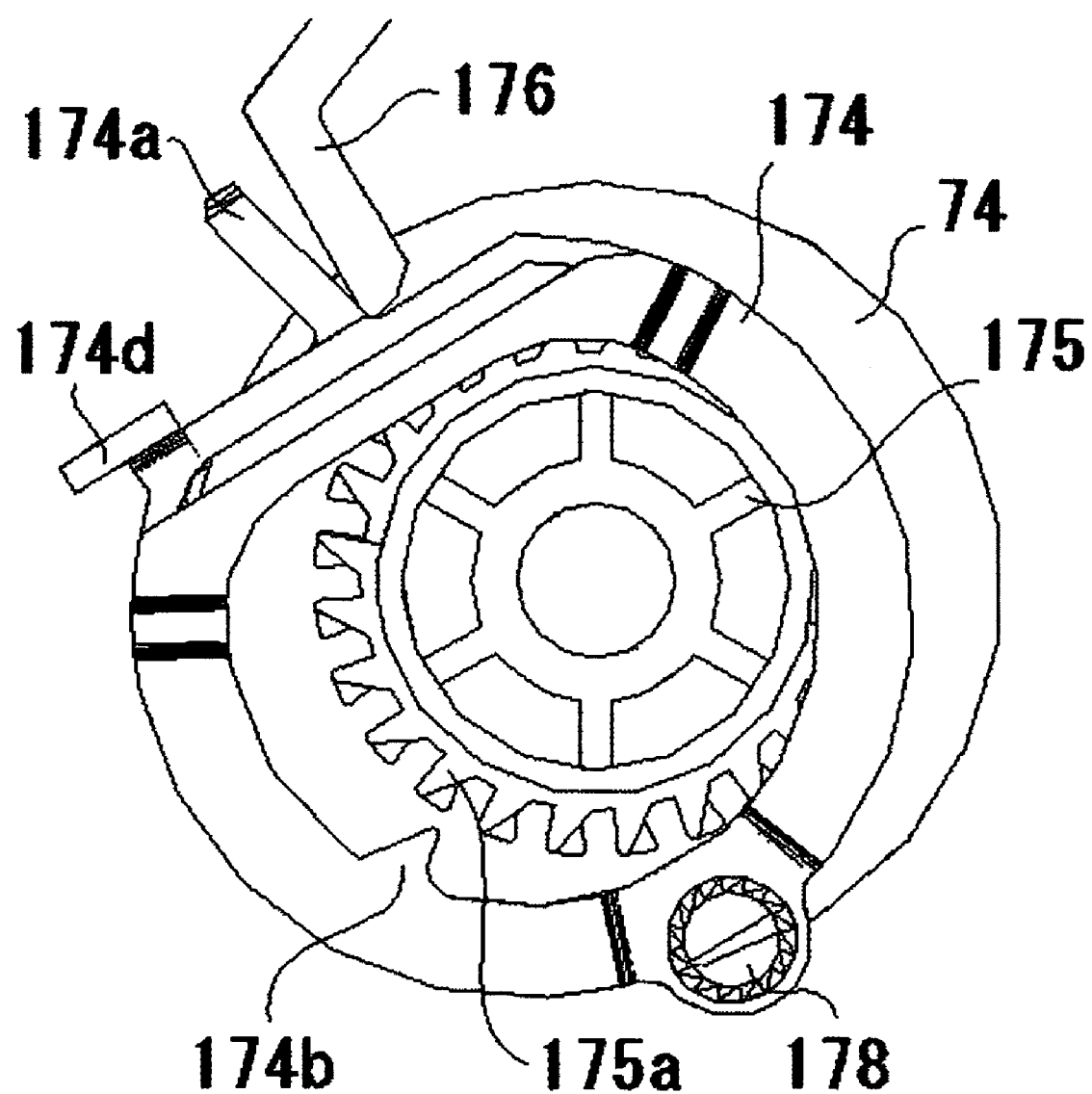
FIG. 16 is a view which explains an operation of the clutch mechanism in a restandby state.

FIGS. 14 to 16 are drawings which describe the operation of the clutch mechanism 173.

As shown in FIG. 14, the trigger lever (the lever) 176 is brought into contact with the clutch cover projecting portion 174a which is formed on an outside of the clutch cover 174. Then, this trigger lever (the lever) 176 imparts a force to the clutch cover 174 in a direction in which the clutch cover 174 is disengaged from the clutch gear 175, whereby the clutch cover 174 is separated from the clutch gear 175 to thereby disconnect power. This state is regarded as OFF or a standby state.

As shown in FIG. 15, the trigger lever (the lever) 176 is dislocated from the clutch cover projecting portion 174a due to a power being imparted thereto from the ASF motor 200. Then, the clutch cover 174 rotates around the clutch cover fixing pin 178 as a fulcrum by a force exerted by the clutch cover tension spring 177, whereby the first clutch cover claw portion 174b is brought into mesh engagement with the first clutch gear toothed portion 175a to thereby transmit power. This state is regarded as ON or a driving state.

As shown in FIG. 16, to return from the driving state to the standby state again, firstly, the trigger lever (the lever) 176 is brought into contact with the outer circumferential portion of the rotating clutch cover 174 by power from the ASF motor 200. Then, since the clutch cover 174 is rotating, the trigger lever (the lever) 176 is automatically brought into abutment with the clutch cover projecting portion 174a, whereby the clutch cover 174 is pushed by the trigger lever (the lever) 176, so that a force is automatically caused to act in a direction in which the clutch cover 174 is separated from the clutch gear 175 and is then allowed to rotate around the clutch cover fixing pin 178 to thereby be separated from the clutch gear 175. Next, the effectiveness of the first mesh engagement portion between the first clutch cover claw portion 174b and the first clutch gear toothed portion 175a and the second mesh engagement portion between the second clutch cover claw portion 174e and the second clutch gear toothed portion 175b of the clutch mechanism 173 will further be described by reference to the drawings.

Figure 17:
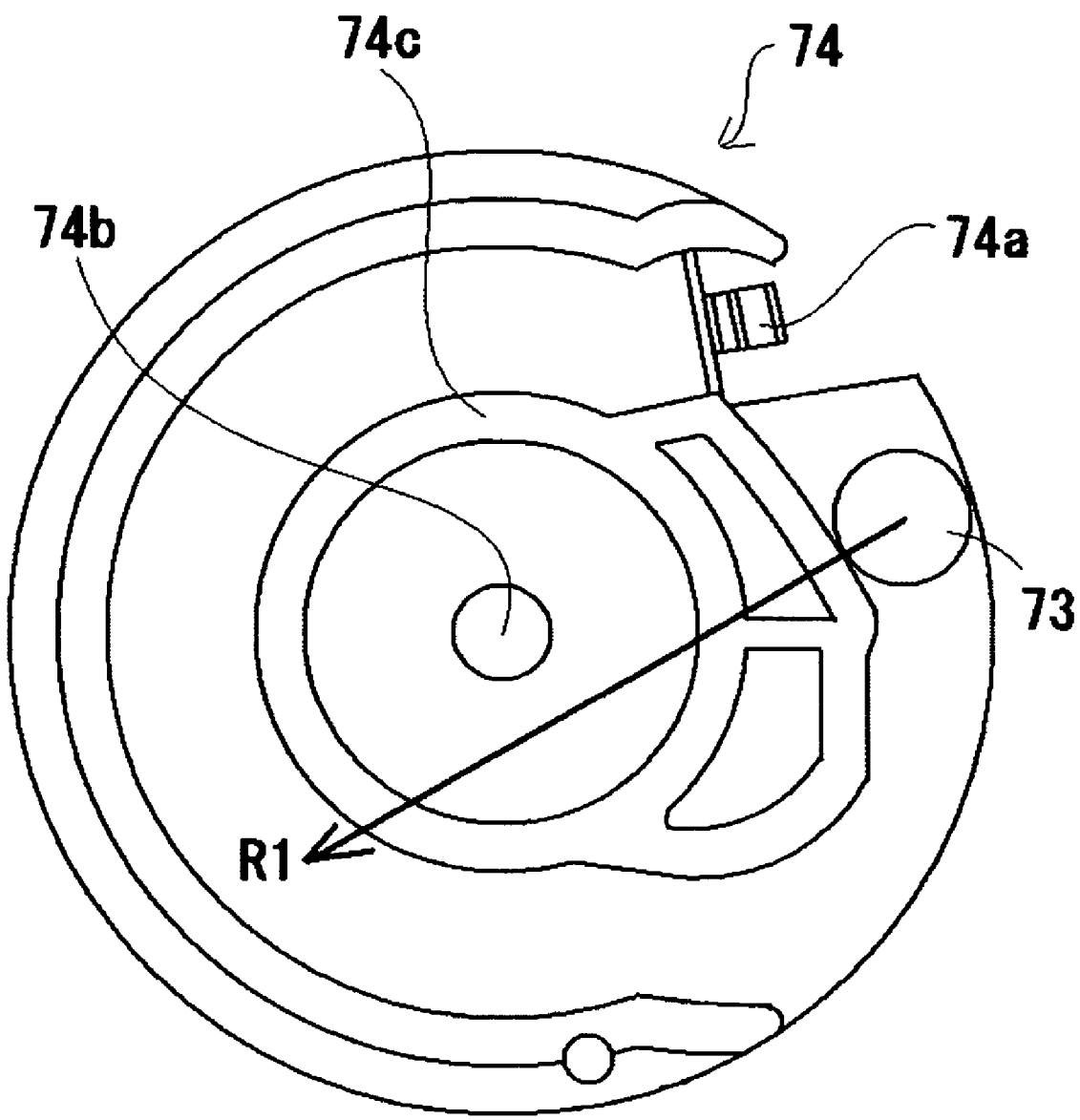
FIG. 17 is a view which shows the direction of a force generated immediately after a cam follower and a cam clutch are brought into abutment with each other.
Figure 18:
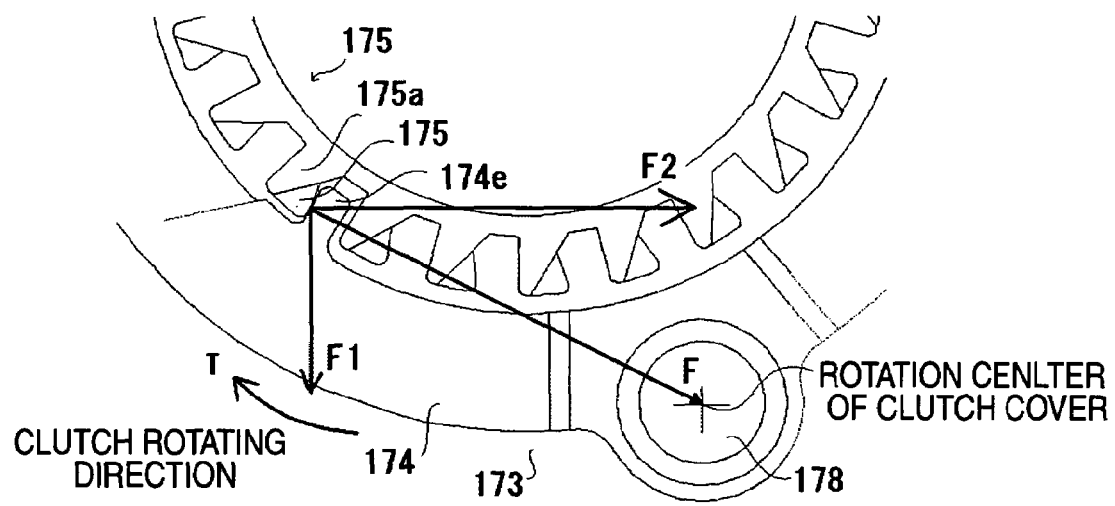
FIG. 18 is a view which shows the direction of a force generated when a reaction force shown in FIG. 17 is exerted immediately after a clutch cover and a clutch gear are brought into abutment with each other.

FIG. 17 is a view which shows the direction of a force that is generated immediately after the cam follower 73 is brought into abutment with the cam clutch 74, and FIG. 18 is a view which shows the direction of a force that is generated when the clutch cover 174 and the clutch gear 175 are imparted a reaction force shown in FIG. 17 immediately after the clutch cover 174 and the clutch gear 175 are brought into abutment with each other.

As shown in FIG. 17, the cam follower 73 is brought into abutment with the cam clutch 74 to thereafter rotate along the cam clutch 74, whereby power can be, as shown in FIG. 9, transmitted to the sheet return shaft 72 which is connected to the cam follower 73. However, a load acting on the retard roller tension spring 63 shown in FIG. 6 is large, and a force generated thereby constitutes a reaction force, which is transmitted to the cam follower 73 via the sheet return shaft 72. Furthermore, since an inner cam 74c within the cam clutch 74 is formed into a special shape, a reaction force R1 transmitted by the cam follower 73 pushes the cam clutch 74 not in a direction towards a cam center 74b but in a direction as shown in the figure, that is, a direction in which the clutch cover 174 is disengaged from the clutch gear 175 when the cam flower 73 is brought into abutment with the cam clutch 74.

As shown in FIG. 18, however, a force F is generated by the reaction force R1 imparted from the cam follower 73 shown in FIG. 17 at a mesh engagement portion between the clutch cover 174 and the clutch gear 175 when power is attempted to be transmitted in a direction T. Here, in the clutch cover 174 and the clutch gear 175 which are brought into mesh engagement with each other at the two mesh engagement portions of the first mesh engagement portion between the first clutch cover claw portion 174b and the first clutch gear toothed portion 175a and the second mesh engagement portion between the second clutch cover claw portion 174e and the second clutch gear toothed portion 175b, since the clutch cover 174 and the clutch gear 175 do not mesh with each other at the first mesh engagement portion but first mesh with each other at the second mesh engagement portion where the clutch cover claw portion 174e meshes with the clutch gear toothed portion 175b, the force F generated at the second mesh engagement portion is generated, as shown in the figure, towards the rotational center of the clutch cover 174. To break down this force, it is seen that a force F2 acting in the direction in which the clutch cover 174 is brought into mesh engagement with the clutch gear 175 is larger than a force F1 acting in the direction in which the clutch cover 174 is disengaged from the clutch gear 175. Due to this, the clutch cover 174 is not disengaged from the clutch gear 175 to thereby eliminate a jump to a different position on the toothed portion of the gear, the sheet feeding being thereby enhanced. At the same time, since there exist the two mesh engagement portions, the transmission of power can smoothly be change over between the two forward and backward directions.

An operation will be described which is to be performed when recording is attempted to be implemented on a sheet by the ink-jet composite machine 100 configured as has been described heretofore. The user stores a plurality of sheets of paper before recording in the supply sheets tray 142 and then activates the ink-jet composite machine 100, The sheets stored in a stacked state In the supply sheets tray 142 are friction fed to the intermediate roller 45 by the pick-up roller unit 41, and only a top sheet of the stacked sheets so fed is separated by the retard roller unit 43 driven by the sheet return shaft 72 so as to be fed further, and the remaining sheets that resided underneath the top sheet so separated are returned to the supply sheets tray 142 by the sheet return 71 driven by the sheet return shaft 72. Then, after having been corrected to be free from skew and aligned for recording, the sheet that is so fed further is held between the sheet feed roller 151 driven by the sheet feeding mechanism 156 and the follower roller 152 thereof to thereby be fed on to the platen 155.

Recording is then implemented on the sheet so fed by the recording head 154 installed on the carriage 153 that is scanned by the carriage motor 159 and the carriage belt 158. As this occurs, a control unit of the ink-jet composite machine 100 supplies inks in six colors such as yellow, magenta, light magenta, cyan, light cyan and black from ink cartridges which reserve therein inks in the six colors, respectively, to the recording head 154 and controls discharge timings of the inks in the respective colors and the drive of the carriage 153 and the sheet feeding roller 151 so as to execute highly accurate ink dot control and half-tone processing. Then, the sheet on which recording is completed is held by the first sheet discharging roller 51 driven by the sheet feeding mechanism 156 and the associated first serrated roller 52, and the second sheet discharging roller 53 and the associated second serrated roller 54 to thereby be fed to the sheet feeding/discharging unit 140 where the sheet is stacked in place in the discharged sheets tray 143.

Thus, as has been described heretofore, according to the ink-jet composite machine 100 of the embodiment of the invention, in the clutch mechanism 173 which connects and disconnects power to and from the retard roller 61 and the sheet return 71, the clutch cover 174 is moved by bringing the trigger lever (the lever) 176 into abutment with and separation from the clutch cover projecting portion 174a, so that the first clutch cover claw portion 174b is brought into engagement with and released from the first clutch gear toothed portion 175a, whereby power is connected and disconnected. In addition, the two mesh engagement portions of the first mesh engagement portion between the first clutch cover claw portion 174b and the first clutch gear toothed portion 175a and the second mesh engagement portion between the second clutch cover claw portion 174e and the second clutch gear toothed portion 175b can be provided by providing the second clutch cover claw portion 174e and the second clutch cover toothed portion 175b, and as a result, the clutch mechanism 173 can be provided which is formed into the two-stage configuration for the forward and backward rotations.

In particular, since the two mesh engagement portions of the first mesh engagement portion and the second mesh engagement portion can be provided, force acts in the direction in which the clutch cover 174 and the clutch gear 175 mesh with each other whether it is exerted in the forward or backward direction.

For example, the clutch cover 174 is rotatably supported on the cam clutch 74 by means of the clutch cover fixing pin 178 inserted in the clutch cover fixing hole 174*c* in such a manner as to rotate when the trigger lever (the lever) 176 is brought into abutment with and separation from the clutch cover projecting portion 174*a* so as to be brought into engagement with and released from the clutch gear 175. Then, the first mesh engagement portion between the first clutch cover claw portion 174*b* and the first clutch gear toothed portion 175*a* and the second mesh engagement portion between the second clutch cover claw portion 174*e* and the second clutch gear toothed portion 175*b* are formed respectively such that a force generated at each of the respective mesh engagement portions is directed towards the rotational center of the clutch cover 174, whereby when a large external force is exerted, even in the event that the clutch cover 174 meshes with the clutch gear 175 at either of the first mesh engagement portion and the second mesh engagement portion, the force exerted is caused to act in the direction in which the clutch cover 174 meshes with the clutch gear 175 so as to prevent the separation of the relevant members at the mesh engagement portion to thereby suppress the jump to a different position on the toothed portion of the gear, thereby making it possible to enhance the power transmission accuracy.

In addition, as the mesh engagement portion between the clutch cover 174 and the clutch gear 175, there are provided the two mesh engagement portions of the first mesh engagement portion for the forward rotation and the second mesh engagement portion for the backward rotation, whereby the connection and disconnection of power can be implemented in a smooth and ensured fashion.

The invention can be applied to any recording apparatus including, for example, a facsimile transmission device, copying machine and the like, provided that they are provided with a medium feeding apparatus. In addition, the invention can be applied not only to those recording apparatuses but also to liquid ejecting apparatuses which eject, in place of ink, liquid for a specific application from a liquid ejecting head to a target medium so that the elected liquid adheres to the target medium. The liquid ejecting apparatuses include those equipped with, for example, a color material ejecting head which is used in producing color filters for liquid crystal displays, an electrode material (conductive paste) ejecting head which is used in forming electrodes for organic EL displays and face emitting displays (FED), a biological organic material injecting head which is used in producing biochips and a sample ejecting head as a precision pipette.

What is claimed is:

1. A power connection/disconnection mechanism which connects and disconnects power, comprising:
   a rotatable clutch cover having:
      a claw portion; and
      a projection with which a contact portion of a lever is brought into abutment;
   a gear having a toothed portion which is brought into engagement with and disengagement from the claw portion,
   wherein a mesh engagement portion formed from the claw portion and the toothed portion has two stages for forward and backward rotations;
   wherein a force exerted on a meshing surface of the claw portion and the toothed portion acts in a direction in which the claw portion and the toothed portion mesh with each other;
   wherein the clutch cover is rotatably supported so as to rotate in accordance with the contact portion being brought into abutment with and separation from the projection and to be brought into disengagement from and engagement with the toothed portion;
   wherein the mesh engagement portion is formed such that a meshing force is directed towards a rotational center of the clutch cover;
   wherein the mesh engagement portion comprises a first mesh engagement portion for a forward rotation and a second mesh engagement portion for a backward rotation;
   wherein the mechanism further comprises:
      a cam clutch having a clutch cover fixing pin engaged with a clutch cover fixing hole which is provided on a rotational center of the clutch cover; and
      a clutch cover tension spring which imparts tension in a direction in which the clutch cover and the clutch gear are brought into mesh engagement with each other;
   wherein the claw portion comprises a first claw portion and a second claw portion, and the toothed portion comprises a first toothed portion and a second toothed portion;
   wherein the first claw portion and the first toothed portion are engaged with each other to form a first mesh engagement portion for a forward rotation, and the second claw portion and the second toothed portion are engaged with each other to form a second mesh engagement portion for a backward rotation;
   wherein the first claw portion and the second claw portion are formed on an inner circumferential surface of the clutch cover and the projection is formed on an outer circumferential surface thereof;
   wherein the first claw portion and the second claw portion are continuously formed in an axial direction of the gear;
   wherein the first toothed portion and the second toothed portion are continuously formed in the axial direction of the gear; and
   wherein the claw portion and the rotational center of the clutch cover are provided at a lower portion of the clutch cover.

2. A medium feeding apparatus which feeds a medium, comprising a power connection/disconnection mechanism according to claim 1.

* * * * *